US012639158B2

(12) United States Patent
Bishop et al.

(10) Patent No.: US 12,639,158 B2
(45) Date of Patent: May 26, 2026

(54) SYSTEM AND METHOD FOR MAINTAINING AND SECURING SOFTWARE CODE

(71) Applicant: Bank of America Corporation, Charlotte, NC (US)

(72) Inventors: Jack Bishop, Evanston, IL (US); Adam B. Richman, Charlotte, NC (US); Jason Conrad Starin, Huntersville, NC (US); Nathaniel Clark, Wheaton, IL (US); Ryan Francis Muzzo, St. Charles, IL (US); Timothy Andrew Wright, Bracknell (GB)

(73) Assignee: Bank of America Corporation, Charlotte, NC (US)

( * ) Notice: Subject to any disclaimer, the term of this patent is extended or adjusted under 35 U.S.C. 154(b) by 22 days.

(21) Appl. No.: 18/796,462

(22) Filed: Aug. 7, 2024

(65) Prior Publication Data

US 2026/0044403 A1 Feb. 12, 2026

(51) Int. Cl.
*G06F 11/07* (2006.01)
*G06F 21/57* (2013.01)

(52) U.S. Cl.
CPC ...... *G06F 11/0793* (2013.01); *G06F 11/0706* (2013.01); *G06F 21/577* (2013.01); *G06F 2221/033* (2013.01)

(58) Field of Classification Search
CPC ............... G06F 11/0706; G06F 11/079; G06F 11/0793; G06F 21/577; G06F 2221/033
See application file for complete search history.

(56) References Cited

U.S. PATENT DOCUMENTS

| 9,069,737 | B1 | 6/2015 | Kimotho et al. |
|---|---|---|---|
| 9,386,034 | B2 | 7/2016 | Cochenour |
| 10,747,651 | B1 | 8/2020 | Vanderwall et al. |
| 10,868,825 | B1 | 12/2020 | Dominessy et al. |
| 10,970,395 | B1 | 4/2021 | Bansal et al. |
| 10,997,015 | B2 | 5/2021 | Singh et al. |
| 11,121,872 | B2 | 9/2021 | Digiambattista et al. |
| 11,379,219 | B2 | 7/2022 | Bhalla et al. |
| 11,888,890 | B2 | 1/2024 | Maheve et al. |
| 11,954,112 | B2 | 4/2024 | Siebel et al. |
| 2018/0018602 | A1 | 1/2018 | DiMaggio et al. |
| 2019/0280942 | A1 | 9/2019 | Côté et al. |

(Continued)

*Primary Examiner* — Joseph R Kudirka

(57) ABSTRACT

A system includes a memory configured to store a software codebase and an instance of vulnerabilities associated with the software codebase. The system further includes a processor coupled to the memory and configured to access the software codebase and execute a scan to identify sets of metadata associated with the software codebase. The processor is configured to execute a first machine-learning model trained to generate a prediction of feature clusters based on the sets of metadata. The plurality of feature clusters includes a ratio of a vulnerability to a time-intensiveness associated with remediating the vulnerability. The processor is configured to execute a second machine-learning model trained to generate a prediction of associations between the plurality of feature clusters and the instance of vulnerabilities. The prediction of associations includes an estimate of a time-intensiveness for remediating the instance of vulnerabilities.

17 Claims, 3 Drawing Sheets

(56)  References Cited

U.S. PATENT DOCUMENTS

| | | |
|---|---|---|
| 2019/0303726 A1 | 10/2019 | Côté et al. |
| 2021/0035116 A1 | 2/2021 | Berrington et al. |
| 2022/0121455 A1 | 4/2022 | Hoban et al. |
| 2022/0210200 A1 | 6/2022 | Crabtree et al. |
| 2023/0113621 A1 | 4/2023 | Griffin et al. |
| 2023/0195560 A1* | 6/2023 | Haririan ............. G06F 11/0772 |
| | | 714/26 |
| 2023/0274587 A1 | 8/2023 | Gronsbell et al. |
| 2023/0325272 A1 | 10/2023 | Golden et al. |
| 2024/0045713 A1* | 2/2024 | Webb ................. G06F 11/3433 |

\* cited by examiner

SYSTEM AND METHOD FOR MAINTAINING AND SECURING SOFTWARE CODE

TECHNICAL FIELD

The present disclosure relates generally to computing security, and, more specifically, to a system and method for maintaining and securing software code.

BACKGROUND

A software development life cycle (SDLC) generally includes a phase-by-phase process or project management and development framework utilized by software development teams to design and build useful software applications and systems. For example, a typical SDLC may include a planning phase, a design phase, a development phase, a testing phase, a deployment phase, and a maintenance phase. In many instances, after software applications or systems are deployed, one or more software code changes may be requested and executed by software developers.

SUMMARY

The system and methods implemented by the system as disclosed in the present disclosure provide technical solutions to the technical problems discussed above by providing systems and methods for maintaining and securing software code by generating predictions of time-intensiveness for software code remediation. The disclosed system and methods provide several practical applications and technical advantages. Specifically, the present embodiments improve the maintainability, reliability, and security of software applications, systems, and services, as well as the one or more processors and memory on which the software applications, systems, and services may be executed and stored. For example, the present embodiments include accessing and scanning the software codebase of each of a number of software applications for vulnerabilities and then utilizing one or more machine-learning models trained to generate predictions of a time-intensiveness for efficiently and accurately remediating the software codebase.

In particular embodiments, the one or more machine-learning models may be trained to generate predictions of the time-intensiveness for efficiently and accurately remediating the software codebase based on, for example, the identified vulnerabilities and metadata associated with one or more of a development history of the software codebase, a remediation history of the software codebase, a maturity level of the software codebase, or a coding style of the software codebase. In this way, the present embodiments may mitigate the potential for software application faults, software service outages, data breaches, or other systemic vulnerabilities that may occur in codebases of software applications, systems, and services over the lifespan of the software applications, systems, and services. Additionally, by generating predictions of the time-intensiveness for efficiently and accurately remediating a software codebase before a potential outage occurs or systemic vulnerabilities are allowed to propagate to other portions of the software codebase, the present embodiments may further extend the lifespan of software applications, systems, and services.

The present embodiments are directed to systems and methods for maintaining and securing software code by generating predictions of time-intensiveness for software code remediation. In particular embodiments, a system includes a memory configured to store a software codebase of at least one software application and an instance of one or more vulnerabilities associated with the software codebase. In particular embodiments, the instance of one or more vulnerabilities associated with the software codebase may be identified based on a static application security testing (SAST) scan of the software codebase. For example, in one embodiment, the SAST scan of the software codebase may be executed during one or more of an implementation phase of the at least one software application, a development phase of the at least one software application, or a testing phase of the at least one software application.

In particular embodiments, the system further includes one or more processors operably coupled to the memory and may be configured to access the software codebase of the at least one software application. In particular embodiments, the one or more processors may then execute, based on the software codebase, one or more code scans configured to identify one or more sets of metadata associated with the software codebase. In particular embodiments, the identified one or more sets of metadata may include an indication of one or more vulnerabilities associated with the software codebase. For example, in one embodiment, the identified one or more sets of metadata may include metadata associated with one or more of a development history of the software codebase, a remediation history of the software codebase, a maturity level of the software codebase, or a coding style of the software codebase.

In particular embodiments, the one or more processors may be further configured to execute a first machine-learning model trained to generate a prediction of a plurality of feature clusters based at least in part on the identified one or more sets of metadata. In particular embodiments, each of the plurality of feature clusters may include a ratio of a vulnerability to a time-intensiveness associated with remediating the vulnerability. For example, in one embodiment, the first machine-learning model may include one or more of a supervised machine-learning model or a semi-supervised machine-learning model trained to generate the prediction of the plurality of feature clusters.

In particular embodiments, the one or more processors may be further configured to execute a second machine-learning model trained to generate a prediction of one or more associations between each of the plurality of feature clusters and the v of one or more vulnerabilities associated with the software codebase. In particular embodiments, the prediction of the one or more associations may include an estimate of a time-intensiveness for remediating the instance of one or more vulnerabilities associated with the software codebase. For example, in one embodiment, the second machine-learning model may include one or more of an unsupervised machine-learning model or a self-supervised machine-learning model trained to generate the prediction of the one or more associations.

In particular embodiments, the one or more processors may be further configured to generate a notification based at least in part on the estimate of the time-intensiveness for remediating the instance of one or more vulnerabilities. For example, in particular embodiments, the notification may include a confidence score associated with the estimate of the time-intensiveness by which a remediation of the instance of one or more vulnerabilities is to be compared. In particular embodiments, the one or more processors may be further configured to cause to be executed based at least in part on the estimate of the time-intensiveness for remediating the instance of one or more vulnerabilities.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
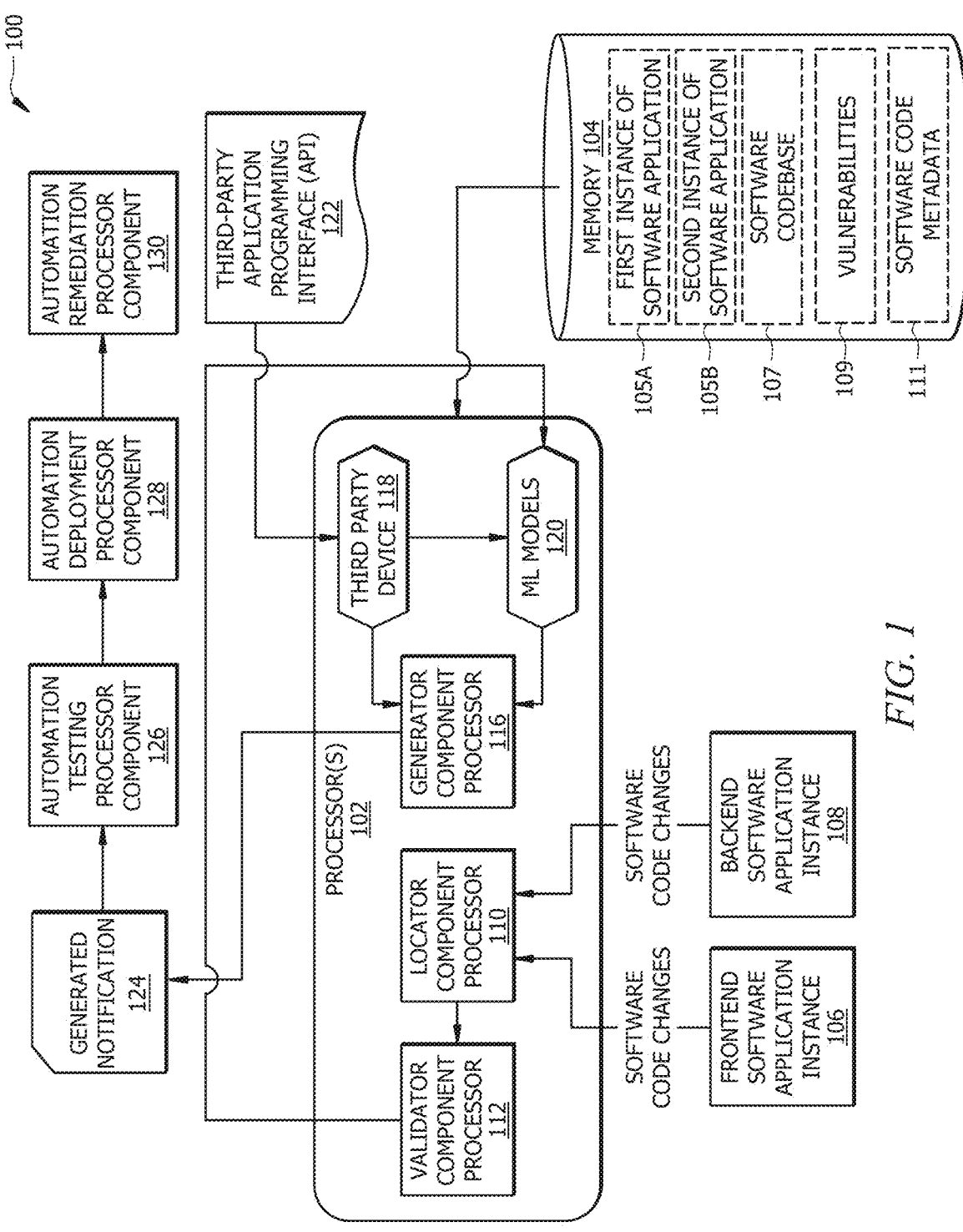
FIG. 1 is a schematic diagram of an integrated software development and maintenance system, in accordance with certain aspects of the present disclosure.

FIG. 1 is a schematic diagram of an integrated software development and maintenance system 100 for maintaining and securing software code by generating predictions of time-intensiveness for software code remediation, in accordance with certain aspects of the present disclosure. As depicted, the integrated software development and maintenance system 100 may include one or more processors 102 and a memory 104, which may be utilized in conjunction to generate predictions of time-intensiveness for software code remediation in accordance with the presently disclosed embodiments. The one or more processors 102 may be operably coupled to the memory 104.

For example, the one or more processors 102 may include any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). In some embodiments, the one or more processors 102 may be a programmable logic device, a microcontroller, a microprocessor, or any suitable combination of the preceding.

The one or more processors 102 may be further communicatively coupled to and in signal communication with the memory 104. The one or more processors may be configured to process data and may be implemented in hardware or software. For example, the one or more processors 102 may be 8-bit, 16-bit, 32-bit, 64-bit or of any other suitable architecture. The one or more processors 102 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors 102 may be further configured to implement various instructions. For example, the one or more processors 102 may be configured to execute instructions stored by the memory 104. In such instances, the one or more processors 102 may be a special-purpose computer designed to implement and execute the functions disclosed herein.

The memory 104 may include one or more disks, tape drives, or solid-state drives, and may be used as an over-flow data storage device, to store programs when such programs are selected for execution, and to store instructions and data that are read during program execution. The memory 104 may be volatile or non-volatile and may include a read-only memory (ROM), random-access memory (RAM), ternary content-addressable memory (TCAM), dynamic random-access memory (DRAM), static random-access memory (SRAM), and so forth. In one embodiment, the memory 104 may include a non-transitory computer-readable medium. As further depicted by the integrated software development and maintenance system 100 of FIG. 1, in particular embodiments, the memory 104 may be operable to store a first instance of the software application 105A and a second instance of the software application 105B.

For example, in one embodiment, the first instance of the software application 105A may include a frontend of a software application 106 and the second instance of the software application 105B may include a backend of a software application 108. While the frontend of the software application 106 and backend of the software application 108 may be labeled as a "frontend" and "backend," respectively, it should be appreciated that the backend of the software application 108 may include any instance of a software application, a software system, or a software service on which the frontend of the software application 106 may be dependent.

The memory 104 may be further operable to store a software codebase 107 or any number of software codebases 107. For example, in one embodiment, the software codebase 107 may include a comprehensive source code for a software application implemented, for example, as the frontend of the software application 106 and the backend of the software application 108. In particular embodiments, the software codebase 107 may be accessed by the one or more processors 102 in response to a request by one or more software developers or software engineers associated with the design, implementation, testing, deployment, and maintenance of one or more of the frontend of the software application 106 or the backend of the software application 108.

In particular embodiments, the one or more processors 102 may access and scan the software codebase 107 to identify and extract an instance of one or more of vulnerabilities 109 (e.g., security vulnerability, design flaw, or other vulnerability) within the software codebase 107 and to identify one or more sets of metadata 111 associated with the software codebase 107. For example, in one embodiment, the one or more processors 102 may execute a static application security testing (SAST) scan of the software codebase 107, in which the SAST scan of the software codebase 107 may be executed during one or more of an implementation phase of the software application corresponding to the software codebase 107, a development phase of the software application corresponding to the software codebase 107, a testing phase of the software application corresponding to the software codebase 107, or a maintenance phase of the software application corresponding to the software codebase 107.

In particular embodiments, the identified one or more sets of metadata 111 associated with the software codebase 107 may include, for example, metadata associated with one or more of a development history of the software codebase 107, a remediation history of the software codebase 107, a maturity level of the software codebase 107, or a coding style of the software codebase 107. The one or more processors 102 may then store the instance of one or more vulnerabilities 109 and the identified one or more sets of metadata 111 to the memory 104.

As further depicted by the integrated software development environment and system 100 of FIG. 1, the one or more processors 102 may include a locator component processor 110, a validator component processor 112, and a generator component processor 116. Although these processors 110, 112, and 116 are illustrated as separate components, they may be implemented in any suitable number and combination of processors to suitable particular tasks of the integrated software development and maintenance system 100. The locator component processor 110 may identify any changes to the software codebase 107 that may be associated with the frontend of the software application 106 or the backend of the software application 108. The locator component processor 110 may then provide the changes to the software codebase 107 to the validator component processor 112.

As further depicted by the integrated software development and maintenance system 100 of FIG. 1, the validator component processor 112 may provide any changes to the software codebase 107 that may be associated with one or more of the frontend of the software application 106 or the backend of the software application 108 to one or one or more machine-learning models 120. Similarly, a third-party device 118 may access any changes or impacts to the software codebase 107 that may be associated with a third-party application programming interface (API) 122.

In particular embodiments, as further depicted by FIG. 1, the one or more processors 102 may execute the one or more machine-learning models 120 that may be utilized to generate a notification 124, which may include one or more predictions of time-intensiveness for software codebase 107 remediation. In one embodiment, the generator component processor 116 may execute the one or more machine-learning models 120 to generate the notification 124. Specifically, as will be discussed in greater detail below with respect to FIG. 2, the one or more machine-learning models 120 may include one or more generative artificial intelligence (AI) models, supervised machine-learning models, unsupervised machine-learning models, or self-supervised machine-learning models that may be suitably trained for generating a prediction of the time-intensiveness for remediating the software codebase 107.

In particular embodiments, the generator component processor 116 may then provide the notification 124 to one or more of an automation testing processor component 126, an automation deployment processor component 128, or an automation remediation processor component 130. For example, the automation testing processor component 126, the automation deployment processor component 128, or the automation remediation processor component 130 may be utilized to test and validate, deploy, and/or remediate the software codebase 107 in accordance with the generated notification 124. Specifically, in one embodiment, the notification 124 may include a recommendation configured to cause to be executed a remediation of the software codebase 107 based on the prediction of the time-intensiveness for remediating the software codebase 107.

Maintaining and Securing Software Code by Generating Predictions of Time-Intensiveness for Software Code Remediation Embodiments of the present disclosure discuss techniques for maintaining and securing software code by generating predictions of time-intensiveness for software code remediation.

Figure 2:
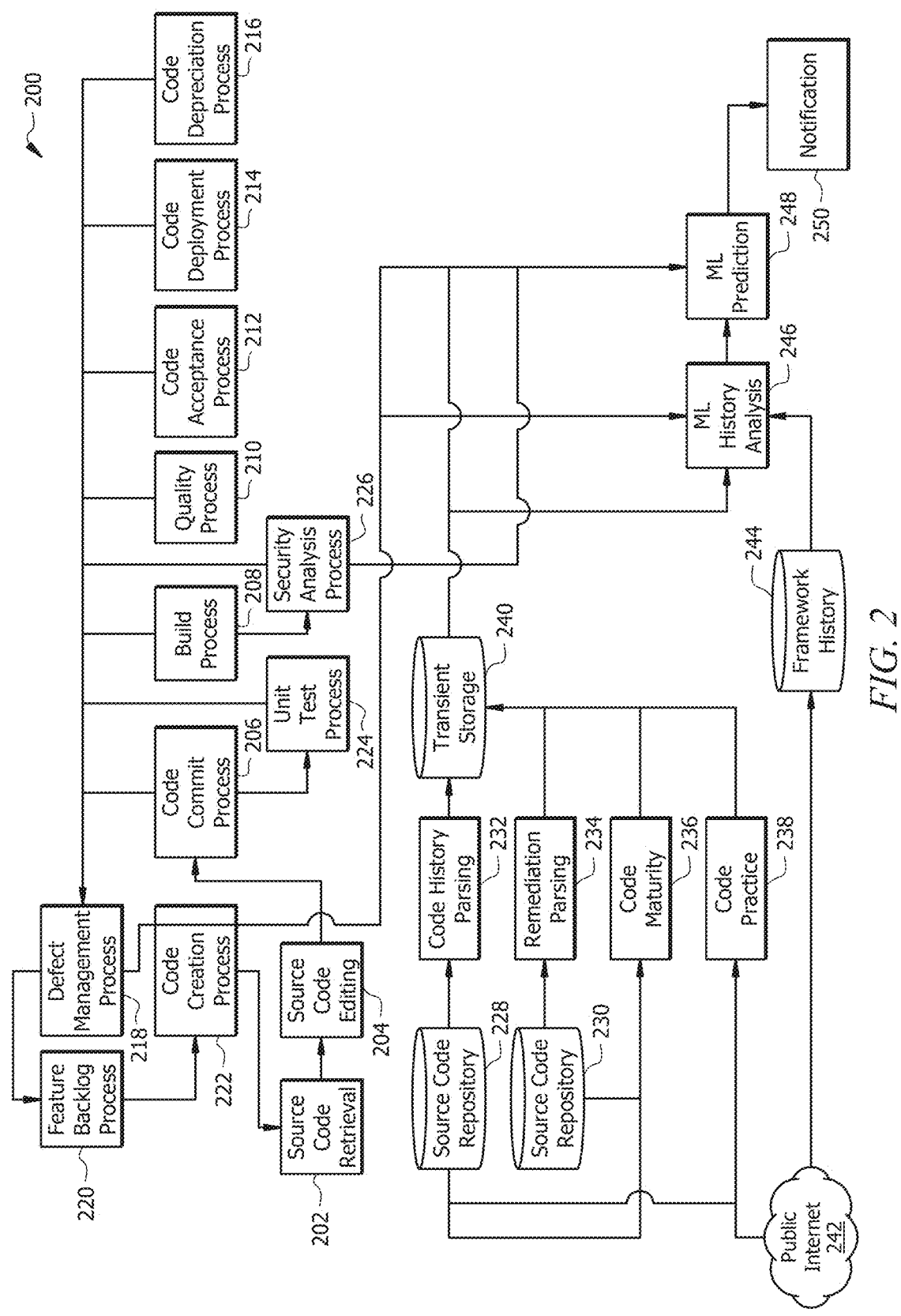
FIG. 2 illustrates a workflow diagram of an embodiment of an integrated software development and maintenance system for maintaining and securing software code by generating predictions of time-intensiveness for software code remediation, in accordance with one or more embodiments of the present disclosure.

FIG. 2 illustrates a workflow diagram 200 of an embodiment of an integrated software development and maintenance system for maintaining and securing software code by generating predictions of time-intensiveness for software code remediation, in accordance with certain aspects of the present disclosure. As used herein, a "remediation" or a "software code remediation" may refer to any process of identifying vulnerabilities, weaknesses, or design flaws in software applications, systems, or services and then executing one or more appropriate actions (e.g., a "rip and replace" of the code associated with the vulnerability, a patching of the code associated with the vulnerability, an automatic generation of remediation code, and so forth) suitable for resolving the identified vulnerabilities, weaknesses, or design flaws.

Furthermore, as used herein, "time-intensiveness" may refer to a measure of time (e.g., processing time, CPU cycle, GPU cycle, mean time to remediation (MTTR), and so forth) or resources (e.g., compute resources, memory resources, personnel resources, and so forth) estimated to be expended to remediate a detected vulnerability within a software application, system, or service. For example, a high "time-intensiveness" indicates that remediating a particular vulnerability within a software application, system, or service would include an expenditure of considerable time and resources. Similarly, a low "time-intensiveness" indicates that remediating a particular vulnerability within a software application, system, or service would include an expenditure of only minimal time and resources. Lastly, a moderate "time-intensiveness" indicates that remediating a particular vulnerability within a software application, system, or service would include an expenditure of only moderate time and resources.

In particular embodiments, the workflow diagram 200 may be part of a larger software development life cycle (SLDC) process, which may include executable subprocesses 202, 204, 206, 208, 210, 212, 214, 216, 218, 220, 222, 224, and 226. In accordance with the presently disclosed embodiments, the workflow diagram 200 may include the integrated software development and maintenance system 100 performing a parsing and extracting metadata subprocess 232 associated with a development history of the software codebase 107 as stored to the source code repository 228 and persisted in the transient storage 240, a parsing and extracting metadata subprocess 234 associated with a remediation history of the software codebase 107 as stored to the remediation repository 230 and persisted in the transient storage 240, a parsing and extracting metadata subprocess 236 associated with a maturity level of the software codebase 107 as stored to the source code repository 228 and the remediation repository 230 and persisted in the transient storage 240, and a parsing and extracting metadata subprocess 232 associated with a coding style of the software codebase 107 as stored to the source code repository 228 and persisted in the transient storage 240 and/or accessed from the public internet 242 and framework history 244.

In particular embodiments, upon the parsing and extracting the one or more sets of metadata, the workflow diagram 200 may continue with the integrated software development and maintenance system 100 executing a first machine-learning model (e.g., machine-learning model based codebase history analysis 246) trained to generate a prediction of a number of feature clusters based on the identified one or more sets of metadata, in which each of the number of feature clusters includes a ratio of a vulnerability to a time-intensiveness associated with remediating the vulnerability. Specifically, feature clustering may include a semi-supervised, unsupervised, or self-supervised machine-learning based technique that may be utilized to group features of a dataset into a number of homogeneous clusters, for example. Thus, in accordance with the presently disclosed embodiments, the machine-learning model-based codebase history analysis 246 may include clustering or grouping different respective vulnerabilities with the corresponding time-intensiveness measure suitable for remediating the respective vulnerabilities.

For example, in one embodiment, the machine-learning model based codebase history analysis 246 may be performed by one or more of a supervised machine-learning model, a semi-supervised machine-learning model, or a unsupervised machine-learning model that may be trained to generate one or more clusters of a ratio of a vulnerability to a time-intensiveness associated with remediating the vulnerability (e.g., instance of one or more vulnerabilities 109) by performing clustered linear regression utilizing the identified one or more sets of metadata.

In particular embodiments, based on the prediction of the number of feature clusters generated based on the identified one or more sets of metadata, the workflow diagram 200 may continue with the integrated software development and maintenance system 100 executing a second machine-learning model (e.g., machine-learning model based prediction of a time-intensiveness for software code remediation 248) trained to generate a prediction of one or more associations between each of the number of feature clusters and the instance of one or more vulnerabilities 109. For example, in one embodiment, the machine-learning model-based prediction of a time-intensiveness for software code remediation 248 may include a prediction of an estimate of a time-intensiveness for remediating the instance of one or more vulnerabilities 109.

In particular embodiments, the second machine-learning model (e.g., machine-learning model based prediction of a time-intensiveness for software code remediation 248) may include one or more of an unsupervised machine-learning model or a self-supervised machine-learning model that may be trained to generate the prediction of the one or more associations between each of the number of feature clusters and the instance of one or more vulnerabilities 109 by performing k-means clustering to match each of the number of feature clusters with one or more of the instance of one or more vulnerabilities 109 and/or one or more support requests (e.g., support tickets) requesting remediation of an instance of a vulnerability 109. In particular embodiments, the prediction of the matches of each of the number of feature clusters with one or more of the instance of the vulnerability 109 and/or one or more support requests (e.g., support tickets) requesting remediation of the instance of the vulnerability 109 may include an estimate of a time-intensiveness for remediating an instance of a vulnerability 109.

In particular embodiments, the workflow diagram 200 may then continue with the integrated software development and maintenance system 100 generating a notification 250 based on prediction of the estimate of the time-intensiveness for remediating an instance of vulnerability 109. For example, in one embodiment, the notification 250 may include a confidence score (e.g., ranging from "0" to "100") or confidence score range (e.g., "0-10"; "20-30"; . . . "90-100") associated with the estimate of the time-intensiveness by which an actual remediation of the instance of vulnerability 109 is to be compared.

Thus, in accordance with the presently disclosed embodiments, the integrated software development and maintenance system 100 may improve the maintainability, reliability, and security of software applications, systems, and services, as well as the one or more processors 102 and memory 104 on which the software applications, systems, and services may be executed and stored by accessing and scanning the software codebase 107 of each of a number of software applications for vulnerabilities 109 and utilizing one or more machine-learning models 120 trained to generate predictions of a time-intensiveness for efficiently and accurately remediating the software codebase 107.

In particular embodiments, the one or more machine-learning models 120 may be trained to generate predictions of the time-intensiveness for efficiently and accurately remediating the software codebase 107 based on, for example, the identified vulnerabilities 109 and metadata associated with one or more of a development history of the software codebase 107, a remediation history of the software codebase 107, a maturity level of the software codebase 107, or a coding style of the software codebase 107. In this way, the present embodiments may mitigate the potential for software application faults, software service outages, data breaches, or other systemic vulnerabilities that may occur in codebases of software applications, systems, and services over the lifespan of the software applications, systems, and services. Additionally, by generating predictions of the time-intensiveness for efficiently and accurately remediating a software codebase 107 before a potential outage occurs or systemic vulnerabilities are allowed to propagate to other portions of the software codebase 107, the present embodiments may further extend the lifespan of software applications, systems, and services.

Figure 3:
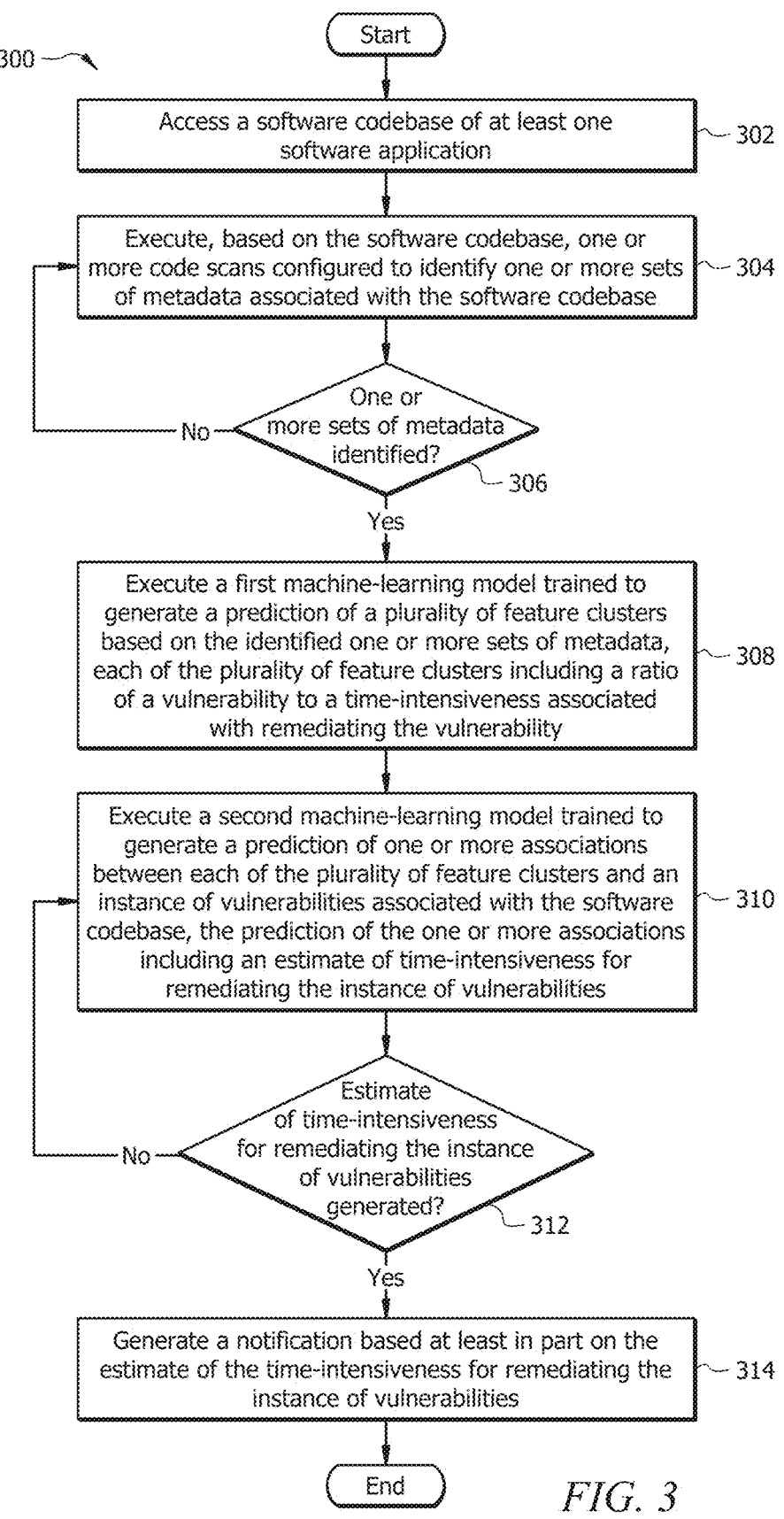
FIG. 3 illustrates a flowchart of an example method for maintaining and securing software code by generating predictions of time-intensiveness for software code remediation, in accordance with one or more embodiments of the present disclosure.

FIG. 3 illustrates a flowchart of an example method 300 for maintaining and securing software code by generating predictions of time-intensiveness for software code remediation, in accordance with one or more embodiments of the present disclosure. The method 300 may be performed utilizing the one or more processors 102 (e.g., locator component processor 110, validator component processor 112, and generator component processor 116) as described above with respect to FIG. 1.

The method 300 may begin at block 302 with the one or more processors 102 accessing a software codebase of at least one software application. For example, in one embodiment, the one or more processors 102 access a software codebase 107, which may be associated with one or more of the frontend of the software application 106 or the backend of the software application 108. In particular embodiments, the method 300 may continue at block 304 with the one or more processors 102 executing, based on the software codebase, one or more code scans configured to identify one or more sets of metadata associated with the software codebase.

For example, in one embodiment, the one or more processors 102 may execute a static application security testing (SAST) scan of the software codebase 107. In some embodiments, the one or more processors 102 may execute the SAST scan of the software codebase 107 may be executed during one or more of an implementation phase of the software codebase 107, a development phase of the software codebase 107, a testing phase of the software codebase 107, or a maintenance phase of the software codebase 107.

In particular embodiments, the one or more sets of metadata may be identified by parsing and extracting metadata associated with one or more of a development history of the software codebase 107 as stored to the source code repository 228 and persisted in the transient storage 240, a remediation history of the software codebase 107 as stored to the remediation repository 230 and persisted in the transient storage 240, a maturity level of the software codebase 107 as stored to the source code repository 228 and the remediation repository 230 and persisted in the transient storage 240, or a coding style of the software codebase 107 as stored to the source code repository 228 and persisted in the transient storage 240 and/or accessed from the public internet 242.

In particular embodiments, the method 300 may then continue at decision 306 with the one or more processors 102 confirming whether the one or more sets of metadata have been identified. In particular embodiments, in response to confirming that the one or more sets of metadata have not been identified, the method 300 may return to block 304 as discussed above. On the other hand, in response to confirming that the one or more sets of metadata have been identified, the method 300 may continue at block 308 with the one or more processors 102 executing a first machine-learning model (e.g., one or more machine-learning models 120) trained to generate a prediction of a plurality of feature clusters based on the identified one or more sets of metadata, in which each of the plurality of feature clusters includes a ratio of a vulnerability to a time-intensiveness associated with remediating the vulnerability.

For example, in particular embodiments, the first machine-learning model (e.g., one or more machine-learning models 120) may include one or more of a supervised machine-learning model or a semi-supervised machine-learning model that may be trained to generate one or more clusters of a ratio of a vulnerability to a time-intensiveness associated with remediating the vulnerability (e.g., vulnerabilities 109) by performing clustered linear regression utilizing the identified one or more sets of metadata.

In particular embodiments, the method 300 may continue at block 310 with the one or more processors 102 executing a second machine-learning model (e.g., one or more machine-learning models 120) trained to generate a prediction of one or more associations between each of the plurality of feature clusters and an instance of one or more vulnerabilities associated with the software codebase, in which the prediction of the one or more associations includes an estimate of a time-intensiveness for remediating the instance of one or more vulnerabilities.

For example, in particular embodiments, the second machine-learning model (e.g., one or more machine-learning models 120) may include one or more of an unsupervised machine-learning model or a self-supervised machine-learning model that may be trained to generate the prediction of the one or more associations between each of the number of feature clusters and the instance of one or more vulnerabilities 109 by performing k-means clustering to match each of the number of feature clusters with one or more of the instance of one or more vulnerabilities 109 and/or one or more support requests (e.g., support tickets) requesting remediation of the record of vulnerabilities 109. In particular embodiments, the prediction of the matches of each of the number of feature clusters with one or more of the instances of one or more vulnerabilities 109 and/or one or more support requests (e.g., support tickets) requesting remediation of the instance of one or more vulnerabilities 109 may include an estimate of a time-intensiveness for remediating the instance of one or more vulnerabilities 109.

In particular embodiments, the method 300 may then continue at decision 312 with the one or more processors 102 confirming whether the estimate of time-intensiveness for remediating the instance of one or more vulnerabilities has been generated. In particular embodiments, in response to confirming that the estimate of time-intensiveness for remediating the instance of one or more vulnerabilities has not been generated, the method 300 may return to block 310 as discussed above. On the other hand, in response to confirming that the estimate of time-intensiveness for remediating the instance of one or more vulnerabilities has been generated, the method 300 may conclude at block 314 with the one or more processors 102 generating a notification based on the estimate of the time-intensiveness for remediating the instance of one or more vulnerabilities. For example, in one embodiment, the notification 250 may include a confidence score (e.g., ranging from "0" to "100") or confidence score range (e.g., "0-10"; "20-30"; . . . "90-100") associated with the estimate of the time-intensiveness by which an actual remediation of the instance of one or more vulnerabilities 109 is to be compared.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
   a memory configured to store a software codebase of at least one software application and an instance of one or more vulnerabilities associated with the software codebase; and
   one or more processors operably coupled to the memory and configured to:
   access the software codebase of the at least one software application;
   execute, based on the software codebase, one or more code scans configured to identify one or more sets of metadata associated with the software codebase, wherein the identified one or more sets of metadata comprises an indication of one or more vulnerabilities associated with the software codebase;
   execute a first machine-learning model trained to generate a prediction of a plurality of feature clusters based at least in part on the identified one or more sets of metadata, wherein each of the plurality of feature clusters comprises a ratio of a vulnerability to a time-intensiveness associated with remediating the vulnerability;
   train a clustering machine-learning algorithm based at least in part on a data set of technical support requests requesting remediation of instances of the one or more vulnerabilities;

execute, in response to the training of the clustering machine-learning algorithm, a clustering machine-learning model to generate a prediction of one or more associations between each of the plurality of feature clusters and the instance of one or more vulnerabilities associated with the software codebase, wherein the prediction of the one or more associations comprises an estimate of a time-intensiveness for remediating the instance of one or more vulnerabilities associated with the software codebase;

output, by the clustering machine-learning model, the estimate of the time-intensiveness for remediating the instance of one or more vulnerabilities associated with the software codebase; and patch the software codebase based at least in part on the estimate of the time-intensiveness to resolve the instance of one or more vulnerabilities associated with the software codebase.

2. The system of claim 1, wherein the estimate of a time-intensiveness comprises a confidence score by which a remediation of the instance of one or more vulnerabilities is to be compared.

3. The system of claim 1, wherein the identified one or more sets of metadata comprises metadata associated with one or more of a development history of the software codebase, a remediation history of the software codebase, a maturity level of the software codebase, or a coding style of the software codebase.

4. The system of claim 1, wherein the first machine-learning model comprises one or more of a supervised machine-learning model or a semi-supervised machine-learning model trained to generate the prediction of the plurality of feature clusters.

5. The system of claim 1, wherein the instance of one or more vulnerabilities associated with the software codebase is identified based on a static application security testing (SAST) scan of the software codebase, and wherein the SAST scan of the software codebase was executed during one or more of an implementation phase of the at least one software application, a development phase of the at least one software application, or a testing phase of the at least one software application.

6. The system of claim 1, wherein the one or more processors are further configured to deploy the patched software codebase.

7. A method, comprising:

accessing a software codebase of at least one software application;

executing, based on the software codebase, one or more code scans configured to identify one or more sets of metadata associated with the software codebase, wherein the identified one or more sets of metadata comprises an indication of one or more vulnerabilities associated with the software codebase;

executing a first machine-learning model trained to generate a prediction of a plurality of feature clusters based at least in part on the identified one or more sets of metadata, wherein each of the plurality of feature clusters comprises a ratio of a vulnerability to a time-intensiveness associated with remediating the vulnerability;

training a clustering machine-learning algorithm based at least in part on a data set of technical support requests requesting remediation of instances of the one or more vulnerabilities;

executing, in response to the training of the clustering machine-learning algorithm, a clustering machine-learning model to generate a prediction of one or more associations between each of the plurality of feature clusters and an instance of one or more vulnerabilities associated with the software codebase, wherein the prediction of the one or more associations comprises an estimate of a time-intensiveness for remediating the instance of one or more vulnerabilities associated with the software codebase;

outputting, by the clustering machine-learning model, the estimate of the time-intensiveness for remediating the instance of one or more vulnerabilities associated with the software codebase; and patching the software codebase based at least in part on the estimate of the time-intensiveness to resolve the instance of one or more vulnerabilities associated with the software codebase.

8. The method of claim 7, wherein the estimate of a time-intensiveness comprises a confidence score by which a remediation of the instance of one or more vulnerabilities is to be compared.

9. The method of claim 7, wherein the identified one or more sets of metadata comprises metadata associated with one or more of a development history of the software codebase, a remediation history of the software codebase, a maturity level of the software codebase, or a coding style of the software codebase.

10. The method of claim 7, wherein the first machine-learning model comprises one or more of a supervised machine-learning model or a semi-supervised machine-learning model trained to generate the prediction of the plurality of feature clusters.

11. The method of claim 7, wherein the instance of one or more vulnerabilities associated with the software codebase is identified based on a static application security testing (SAST) scan of the software codebase, and wherein the SAST scan of the software codebase was executed during one or more of an implementation phase of the at least one software application, a development phase of the at least one software application, or a testing phase of the at least one software application.

12. The method of claim 7, further comprising deploying the patched software codebase.

13. A non-transitory computer-readable medium storing instructions that, when executed by one or more processors of a system, cause the one or more processors to:

access a software codebase of at least one software application;

execute, based on the software codebase, one or more code scans configured to identify one or more sets of metadata associated with the software codebase, wherein the identified one or more sets of metadata comprises an indication of one or more vulnerabilities associated with the software codebase;

execute a first machine-learning model trained to generate a prediction of a plurality of feature clusters based at least in part on the identified one or more sets of metadata, wherein each of the plurality of feature clusters comprises a ratio of a vulnerability to a time-intensiveness associated with remediating the vulnerability;

train a clustering machine-learning algorithm based at least in part on a data set of technical support requests requesting remediation of instances of the one or more vulnerabilities;

execute, in response to the training of the clustering machine-learning algorithm, a clustering machine-learning model to generate a prediction of one or more associations between each of the plurality of feature clusters and an instance of one or more vulnerabilities associated with the software codebase, wherein the prediction of the one or more associations comprises an estimate of a time-intensiveness for remediating the instance of one or more vulnerabilities associated with the software codebase;

output, by the clustering machine-learning model, the estimate of the time-intensiveness for remediating the instance of one or more vulnerabilities associated with the software codebase; and patch the software codebase based at least in part on the estimate of the time-intensiveness to resolve the instance of one or more vulnerabilities associated with the software codebase.

14. The non-transitory computer-readable medium of claim 13, wherein the estimate of a time-intensiveness comprises a confidence score by which a remediation of the instance of one or more vulnerabilities is to be compared.

15. The non-transitory computer-readable medium of claim 13, wherein the identified one or more sets of metadata comprises metadata associated with one or more of a development history of the software codebase, a remediation history of the software codebase, a maturity level of the software codebase, or a coding style of the software codebase.

16. The non-transitory computer-readable medium of claim 13, wherein the first machine-learning model comprises one or more of a supervised machine-learning model or a semi-supervised machine-learning model trained to generate the prediction of the plurality of feature clusters.

17. The non-transitory computer-readable medium of claim 13, wherein the instance of one or more vulnerabilities associated with the software codebase is identified based on a static application security testing (SAST) scan of the software codebase, and wherein the SAST scan of the software codebase was executed during one or more of an implementation phase of the at least one software application, a development phase of the at least one software application, or a testing phase of the at least one software application.

* * * * *